Oct. 16, 1928.

C. J. BAER 1,687,923

CURRENT MOTOR

Filed March 12, 1924      5 Sheets-Sheet 2

Inventor
Carl J. Baer
By
O'Neill Bunn
Attorneys

Oct. 16, 1928.

C. J. BAER 1,687,923

CURRENT MOTOR

Filed March 12, 1924

Oct. 16, 1928.  1,687,923
C. J. BAER
CURRENT MOTOR
Filed March 12, 1924   5 Sheets-Sheet 4

Oct. 16, 1928.

C. J. BAER 1,687,923

CURRENT MOTOR

Filed March 12, 1924     5 Sheets-Sheet 5

Patented Oct. 16, 1928.

1,687,923

UNITED STATES PATENT OFFICE.

CARL J. BAER, OF ST. LOUIS, MISSOURI.

CURRENT MOTOR.

Application filed March 12, 1924. Serial No. 698,691.

This invention relates to means for taking energy and power out of the currents of rivers, canals, creeks and other moving bodies of water, including tide and gulf stream flows.

It is an old art to attempt to take energy from moving streams by damming a stream, raising the water to a given altitude and dropping it through turbine and other power wheels. It is also an old art to attempt to take power from moving streams by radial and endless chain wheels equipped with solid paddles or buckets. Such attempts have been abortive because all solid paddles and buckets tend too greatly to retard the stream flow at the points of contact of the stream with the buckets or paddles; for instance, a solid paddle of ten feet in length and one foot in width has, behind the paddle, a determinable amount of retarding force against the movement of the stream. If a solid paddle of this length were placed into a moving stream 20 ft. wide, with an average speed of stream of 3 miles per hour, the width of the paddle being great enough to reach the bottom of the stream, say three feet deep, and such paddle attached either to an endless chain or to a radial wheel, it would retard, to a certain extent, that part of the stream obstructed by the area of the paddle. Therefore any mechanism which successfully takes power or energy from a moving body of water, must provide for a flow of the stream through as well as against the equipment. In other words, a paddle foraminated in its construction, or provided with holes or slots therethrough, or constructed of a plurality of relatively-spaced smaller units striking the water at many points over a given area, rather than in solid formation, is necessary to the successful operation.

In my Patent No. 1,451,463, I show a screened or perforated paddle for propelling boats, and I have found that the thrust of a perforated paddle, or a paddle made up of multiple units, not only prevents the formation of a strong vacuum behind the paddle in its thrust through the water, and the consequent draw-back effect, but greatly eliminates the lateral and vertical deflection of the water after contact by the paddle. Therefore, by permitting the passage of a portion of the water through the paddle, for direct contact with the sister paddles behind it, the disturbance of the water between the paddles is greatly minimized, and the least disturbance made in the water, the more solid is the water formation for contact against the next paddle and, therefore, the more efficient is the combined thrust delivered to the paddles. Not only is there more efficiency in the direct thrust against a paddle constructed to permit passage of water therethrough, but the elimination of the vacuum behind the paddle is an important factor in power distribution of this character. The power necessary to move a solid paddle through the water is obviously greater than that required to move, the same distance, and under the same conditions, a paddle which permits the passage of water therethrough, as will be readily understood.

In fast moving torpedo boat destroyers a vacuum-formed hole will be noticed behind the destroyer, when running at 32 knots an hour which hole, in size, would be large enough to contain the average sized box freight car, and as the momentum or velocity is increased, the greater the pull back from the stern. This same condition prevails in the swift movement of solid paddles through the water, in all radial wheel constructions, as well as endless chain wheel construction, the paddles behind the first paddle retarding, rather than assisting in the movement of the boat, and the more solid paddles placed in the water, the less efficient is the whole equipment. My method of overcoming this retarding force consists in the utilization of foraminated or multiple paddles in the water, permitting the passage of the water through the paddles and thereby distributing the thrust over more area of the water, with the least disturbances of the latter.

By utilizing a succession of solid paddles in the water, for instance in an endless chain wheel formation, the chain wheel retards the flow of the stream, and on each side of the wheel the stream runs at a given rate, say three miles per hour, the water in contact with the paddles running at very much less speed, being retarded by the paddle area itself. The speed of this particular part of the water would obviously be greatly increased by opening up the paddles, either by perforations, by slots, or by multiple paddle formation.

I now propose to utilize foraminated paddles in an apparatus for taking power from running water, or paddle elements of any construction permitting the passage of water therethrough. Such an apparatus may be placed in a current of moving water, permitting the water to run as it were through the water engaging elements, therefore not attempting to take the entire volume of energy from the water in its contact with the first paddle, but to permit a restricted flow through the paddle perforations or apertures, which flow continues freely throughout the entire multiple paddle equipment. Under such circumstances a given percentage of water energy effects a movement of the paddles through the water, each paddle bearing its own load, each paddle being contacted by the relatively undisturbed water which has passed through the preceding paddle, all of the paddles therefore operating as power units rather than retarding units, as would be the case in the solid paddle construction.

In actual practice this principle may be applied to endless chains or cables, to which is attached a plurality of paddles or buckets, of fabricated material of any kind, so designed as to hold or take from the stream a certain percentage of the water energy, allowing a certain proportion of the energy to pass through the paddle construction, for contact with the succeeding paddles on the chain. By such construction I am able to lay a belt upon the surface of the water, or to any depth beneath the surface, and by means of such belt of paddles or buckets in endless chain formation, the retarding forces incident to the entrance of the paddle into the water, and the egress of the paddle from the water, as well as the friction and energy used to operate the entire water wheel mechanism, are minimized to the greater degree.

In order to reduce such friction and retarding forces to the minimum, the buckets or paddles are constructed, for flotation, of the lightest kind of material and the dimensions of the paddle area, or of the drive wheel and length of the chain, may be varied to suit the conditions.

The principle of permitting the passage of water through the paddle element is of course also applicable to propelling devices other than the endless chain construction such as radial paddle wheels, and screw propellers. The radial paddle wheel may also be provided with paddle elements which permit the passage of water or air therethrough, but, since such paddles never travel in longitudinal parallelism, it is obvious that the chain drive is more advantageous, since the water may be fed through one paddle to the next succeeding paddle, throughout the entire length of paddle submergence. It is undoubtedly true however that all paddle mechanisms which are adapted for contact with air, water or any other fluid, would be greatly increased in efficiency, if provision were made whereby to permit a portion of the air, water or fluid to pass through the front paddle, and thereafter contact the succeeding paddle, as hereinbefore explained.

In the drawings accompanying this specification I have chosen to show my invention applied to a flexible endless belt, such as a chain or cable.

In said drawings:

Fig. 4 is an end elevation of the apparatus.

Fig. 5 is a fragmentary perspective view of one form of paddle member.

Fig. 5$^a$ is a detail section, showing means for hanging a paddle element.

Fig. 6 is a section on line 6—6 of Fig. 5.

Fig. 7 is a sectional view of a slightly modified form of paddle member.

Figure 1:
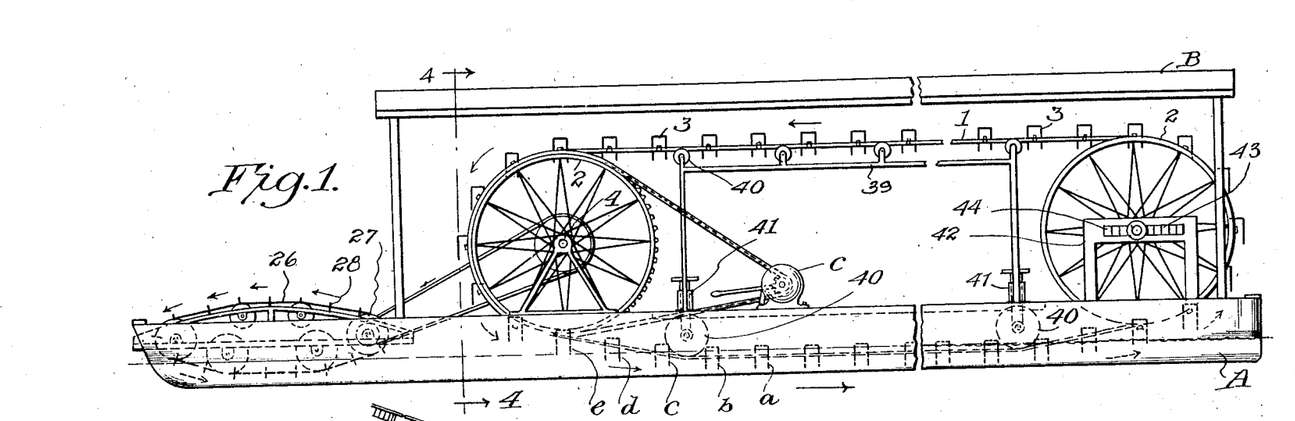
Fig. 1 is a side elevation of an apparatus adapted to take energy from a stream of running water.

Now referring specifically to the drawings, and especially to Fig. 1, A, A indicate pontoons, here shown as arranged in parallelism, constructed so as to provide a high degree of buoyancy. The pontoons are provided with cross framework B, which couples them, and also supports the endless conveyor 1, travelling around wheels or drivers 2, one near each end of the pontoons. The conveyors 1, here shown as a cable, carry a plurality of foraminated paddle elements 3, so mounted as to present their larger surfaces for contact by the water.

Figures 9, 10, 11, 12:
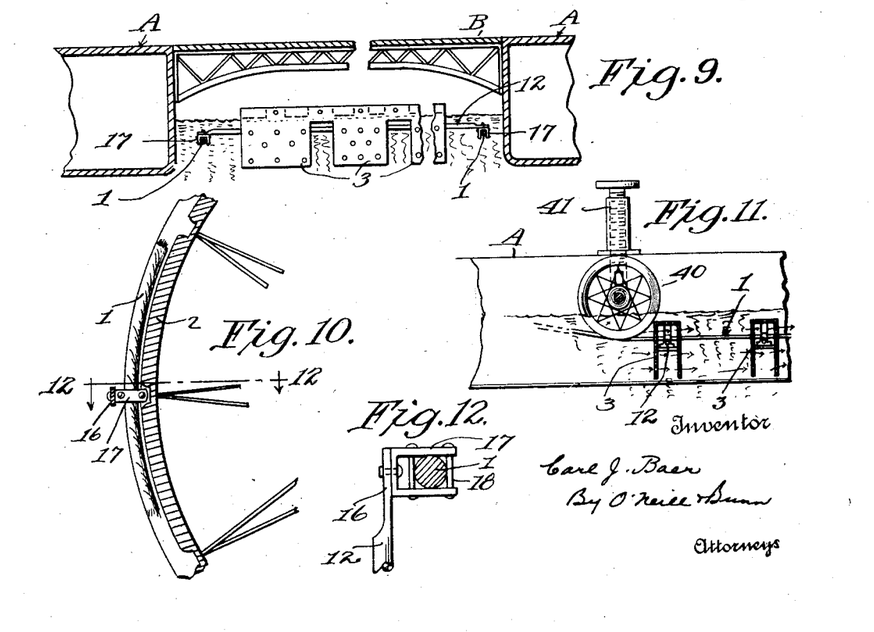
Fig. 9 is a fragmentary vertical section taken in a plane extending transversely of the apparatus and approximately centrally thereof.
Fig. 10 is a fragmentary detail of the wheel which supports the endless conveyor.
Fig. 11 is a fragmentary detail, on a reduced scale, showing the paddles fully submerged in the water.
Fig. 12 is a detail showing the method of attaching the paddles to the endless conveyor.

The structure so far described is to be positioned in a current of running water, and may be fixed in position so as not to float with the current. The wheels 2 are anti-frictionally mounted, and the cable 1 is so constructed that it may be adjusted to run just above the water, permitting the paddles 3 to become almost wholly immersed, as shown in Fig. 1, or the lower section of the cable and the paddles carried thereby may be wholly immersed, as shown in Fig. 11. Under such circumstances it is obvious that the current would tend to force the paddles 3 down the river, resulting in a rotation of the axle 4 of the front wheel 2, the cable 1 necessarily travelling around the wheels, as will be clearly understood.

In the action just described, it is clear that the rotative energy imparted to the axle 4, is governed entirely by the the speed and volume of the current of water, and the combined area of the paddle elements positioned for contact by the water, which area is of course dependent upon the number of paddles in the water, and the volume of water engaging each paddle. The number of paddles utilized may be varied at will by increasing or decreasing the length of the cable 1, or by so vertically adjusting the cable, or laterally adjusting the wheels 2, that a greater or less number of paddles are immersed in the water. The amount of water power delivered to each immersed paddle however, is dependent upon the amount of water which is allowed to come into contact therewith. Relatively undisturbed water will make complete contact with the paddle, but, if the water is allowed to pile up behind one paddle thereby forming a vacuum in the water in front of said paddle, such vacuum, or hole in the water prevents the power of the water from being delivered to the next paddle in front, such paddle therefore becoming a retardent to the apparatus.

Figures 4, 5, 5A, 6, 7:
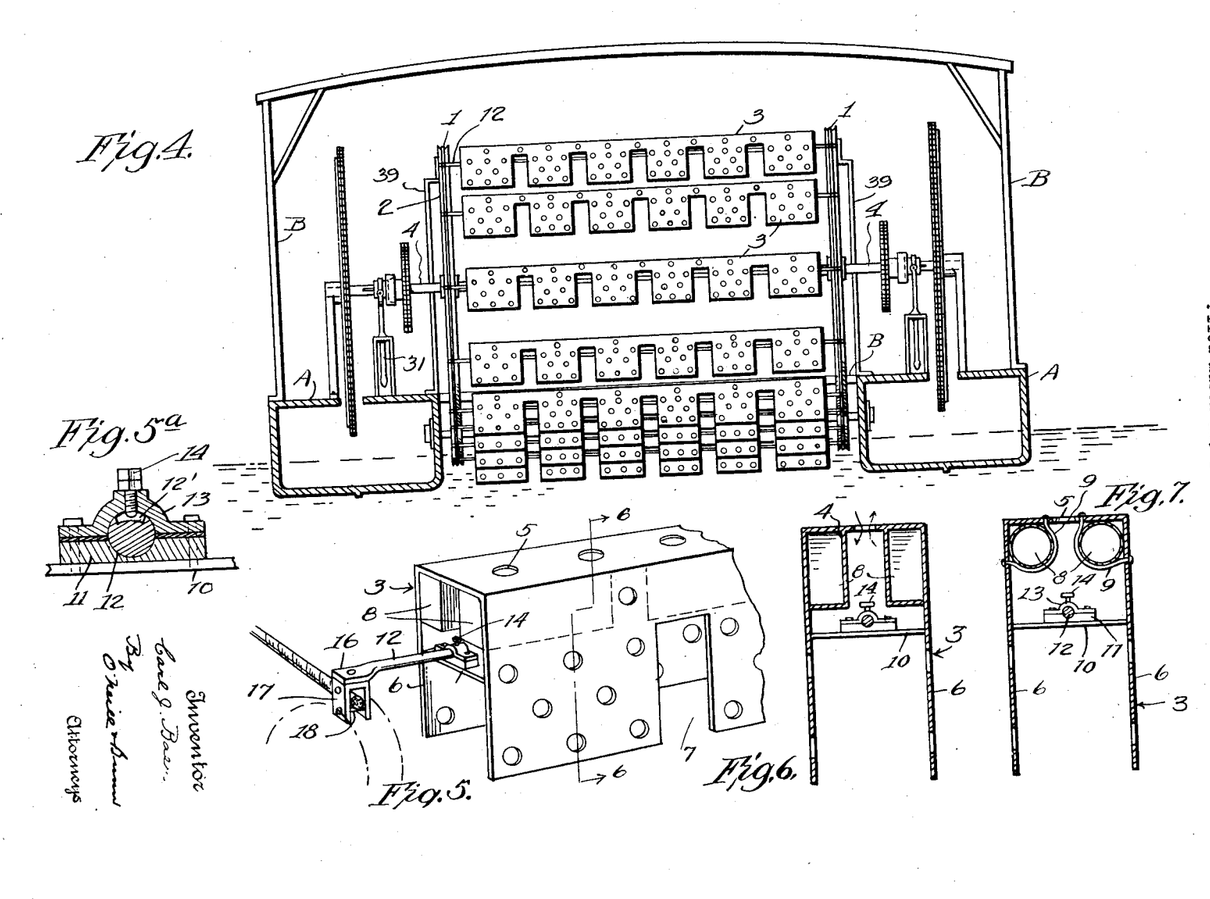
Figure 8:
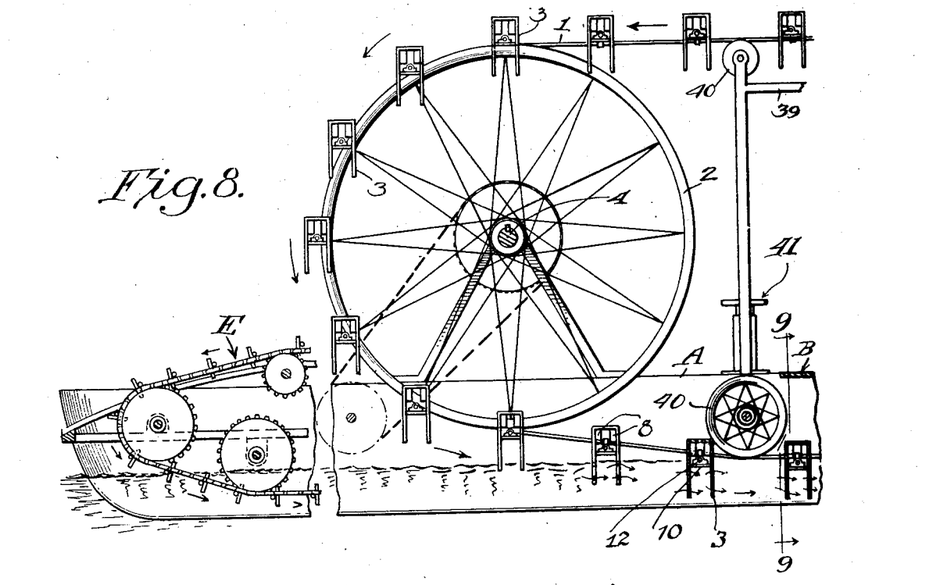
Fig. 8 is a detailed view of the front end of the apparatus, in side elevation.

In order that each and every paddle may assist in the rotation of the shaft 4, I so construct them as to permit a passage of water directly therethrough. One form of such paddles is shown in Figs. 5 and 6, a slight modification being illustrated in Fig. 7. The paddle 3 is here shown as a chambered structure of sheet metal, but it may be formed of any material adapted to withstand the pressure to which it may be subjected. It is provided with a top wall 5 and side walls 6, 6 and is open longitudinally throughout its length as shown in Fig. 6. The top wall 5 is provided with a plurality of apertures which permit the escape of air when the paddle enters the water, and both side walls 6, 6, are also provided with a plurality of apertures, permitting the transverse passage of water through the paddle, after immersion. In addition thereto each side wall 6 is provided with a relatively large opening 7, which registers with the opening in the other side wall 6, whereby to permit a relatively free and unrestricted passage of water through the paddle. By this construction a paddle may impart to the shaft 4 a portion only of all the energy of the water which comes in alignment with the path of travel of the paddle, but sacrifices the remaining portion of such energy to feed the paddle which is travelling directly in front, whereby the front paddle assists in the rotation of the shaft 4, rather than making it necessary for the shaft to pull the paddle along.

It is preferred that the paddles be buoyant, and, to this end, each is provided with compartments 8, 8, which may be air-tight and welded to the interior walls of the paddle, or may be filled with cork or other buoyant material, in which case it is not necessary that they be air or water-tight. A modification of the compartments 8, 8 is shown in Fig. 7, where the compartments are formed of cylindrical containers, held in position by a strap 9 embracing the containers and extending through the walls 5 and 6 of the paddles.

Each paddle is provided with a supporting bracket 10 riveted or otherwise secured to the walls 6, 6, and a bearing block 11 is mounted on the bracket 10. A connecting rod 12, is rotatively secured into the bearing in block 11, and is held therein by a strap 13. The rod 12 is provided with a curved slot 12′, directly under the strap 13, and a set-screw 14, as seen in Fig. 5ª, extends through the strap 13 and into the slot 12′, permitting limited rotation of the rod 12, and preventing longitudinal movement thereof. The rod 12 extends outwardly and preferably terminates in a flattened end 16 which is riveted to a yoke 17 straddling the cable 1, disengagement between the yoke and cable being prevented by bolts 18 extending through the sides of the yoke 17, above and below the cable 1. By the construction which includes the set-screw 14 and the slot 12′, the paddle may swing upon the cable like a pendulum, or may be tightened by means of the screw 14 riding in a slot 12′ in the rod 12. The paddle cannot swing so far as to fail to present an effective resistance to the water, because such swing would be prevented by the vertical wall of the slot 12′. The rod 12 extends through the paddle at a point above the longitudinal axis of the latter, whereby the paddle may always have a slight pivotal action around the rod, said action being limited by the pin 14 and slot 12′, as stated. This construction obviously permits a limited pendulum swing of the paddle whereby it may enter the water in a natural position and be capable of a swing limited by the dimensions of the slot 12′. The paddle thereby accommodates itself to the force of the current, and is capable of a slight tilt to allow the passage of driftwood thereunder, if necessary.

Figures 14, 15, 16, 17, 18:
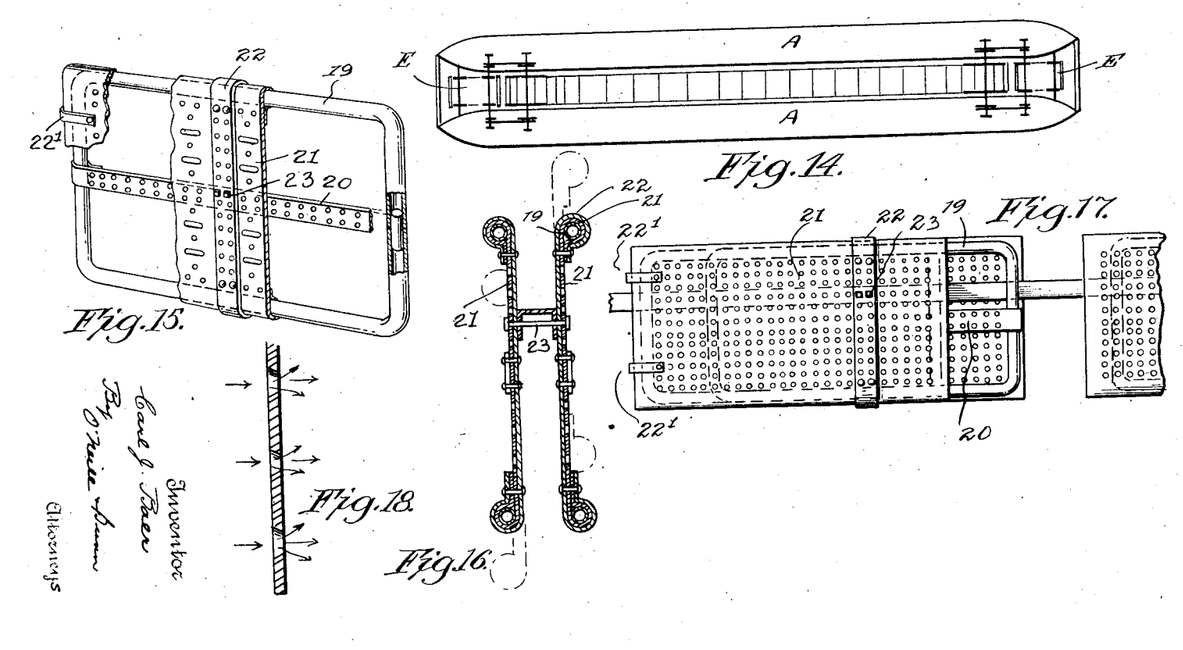
Fig. 14 is a top plan view, partly diagrammatic, showing a modified form of the apparatus.
Fig. 15 is a perspective view, partly in section, showing another form of paddle.
Fig. 16 is a transverse sectional view of another form of paddle.
Fig. 17 is a plan view of the propeller shown in Fig. 16.
Fig. 18 is a sectional detail showing the scope of one form of perforation through the paddle.

Figs. 15, 16, 17 and 18 represent other forms of propellers which may be used. In Fig. 15 is shown a paddle framework 19, of rectangular formation. It may be a hollow tube, provided with a longitudinal brace 20, wrapped around and riveted at each end to the sides of the bars. A covering is provided for the frame 19, such covering being here shown as a flat perforated plate 21, having its upper and lower edges curved around and embracing the top and bottom bars of the frame 19, and riveted to the body of the brace 20. A vertical strap 22 is then riveted through the plate 21, and through the brace 20, providing a strong and efficient paddle structure. It is to be noted that the plate 21 is provided with a plurality of perforations, consisting of apertures and slots, the disposition of which may be as desired, the primary idea being to permit passage of water through the plate 21. The plates 21 are further secured to the frame 19, by clips 22′ which embrace the outer edge of the plate, and the side of the frame 19, the inner ends of the clip being secured each to each by headed bolts, or rivets passing through the plate, see Fig. 15.

Fig. 16 shows two of the paddles disclosed in Fig. 15, laterally separated by spacing bolts 23. In this construction the plates 21 may be detached from the brace 20 and the securing bolts 23 inserted in other apertures in the plates, so that one plate may be raised above the plane of the other, as shown in dotted lines Fig. 16, or the separation may be effected and one plate moved laterally of the other, as shown in Fig. 17, whereby to present a longer paddle, where desired.

I prefer to taper the apertures through the paddles, as indicated in Fig. 18, presenting the largest area of the aperture upstream. Such construction presents a greater area for water friction while passing through the apertures, and also increases the velocity of the water which does pass through, causing it to more forcibly engage the next paddle.

Figure 2:
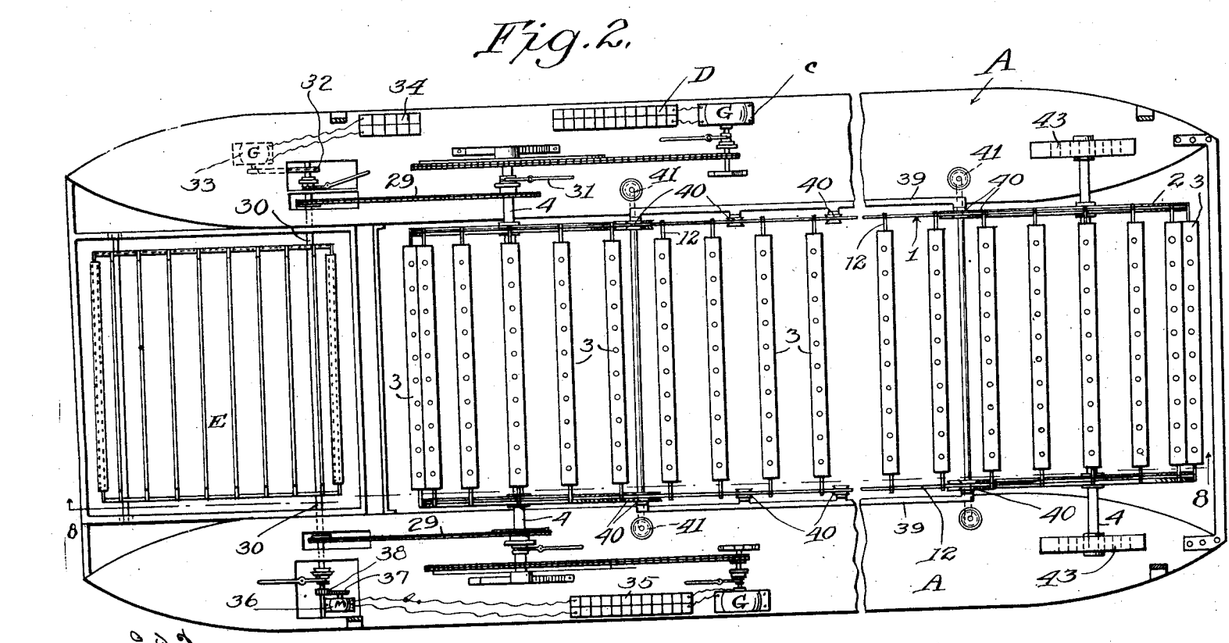
Fig. 2 is a top plan view of the apparatus.

It is obvious that the apparatus may carry as long a belt of paddles as is desired, and the dimensions of the paddles may be suited to the conditions. As indicated in Fig. 2, the shaft 4 is geared to an electric generator G, adapted to discharge to storage batteries D, suitable clutch mechanisms being provided whereby to disconnect and connect the generator as desired. It is clear that the power so gathered may be delivered to any point and for the performance of any work, and it is equally obvious that the shaft 4 might be geared directly to any power wheel or pulley.

Figure 3:
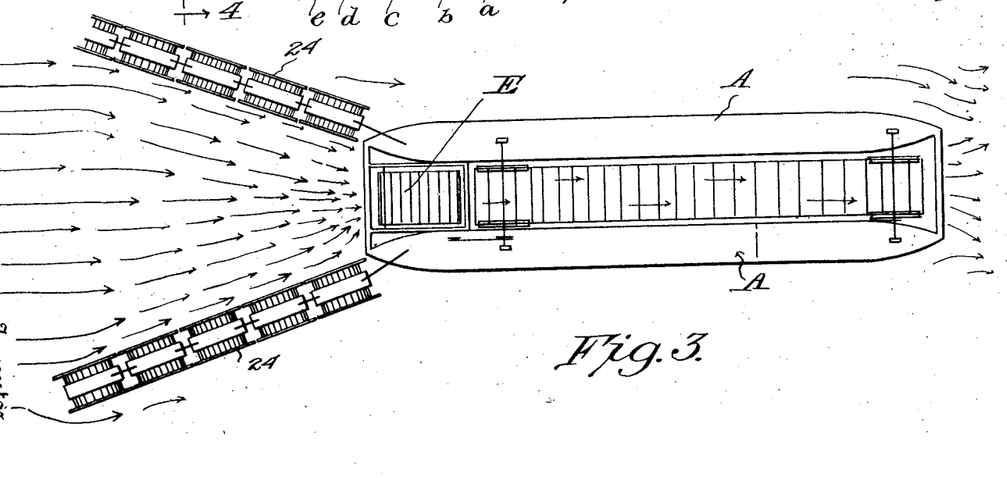
Fig. 3 is a top plan view of the apparatus, showing means for concentrating the water to a certain path.
Figure 13:
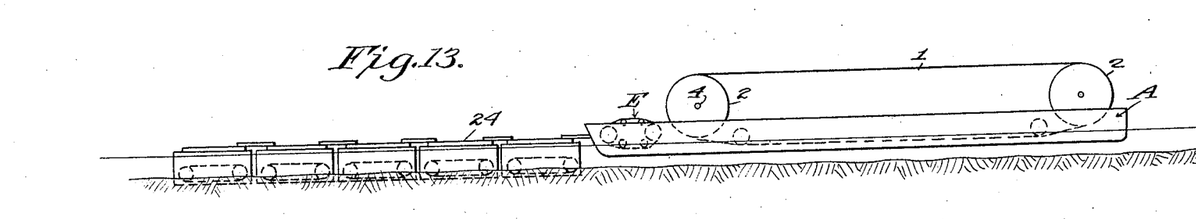
Fig. 13 is a side view, partly diagrammatic, of the apparatus shown in Fig. 3.

In order to insure the desired volume of water passing between the pontoons A, I may utilize what might be termed dam units, to concentrate the flow of water to a given path between the units. Such arrangement is shown in Figs. 3 and 13, and I prefer to utilize units which are self-propelled, each unit being equipped with means for varying its displacement, and with propelling means whereby it may travel through the water, or along the bottom thereof. Such units are further provided with side plates 70 which are reciprocable vertically of the units, and also laterally thereof, whereby to prevent passage of water beneath and between the units, such units being shown in my Patent No. 1,399,286, issued Dec. 6, 1921. In concentrating a flow of water beneath and between pontoons A, I arrange a plurality of dam units 24 in the position shown in Fig. 3, the units diverging upstream. The units are navigated to that position under their own power, and sunk until the caterpillar tractors engage the bottom, mooring the units in proper location. The plates 25 are then dropped so that they engage the bottom of the river, and the plates on one unit contacts the plate on the adjacent unit, such method forming a dam sufficient to deflect a large volume of water under and between the pontoons, and with an increased velocity, as will be understood. Such velocity increases the rapidity of rotation of the shaft 4, as will be obvious, rendering the current motor more efficient.

In Figs. 1, 3 and 14, I have shown an accelerator unit E carrying an endless chain 26, running over power wheel 27, the chain 26 carrying a plurality of perforated paddles 28, adapted to drive the unit through the water. The power for driving the accelerator unit E is taken from the shaft 4 of the wheel 2, the shaft 4 carrying a sprocket wheel at each end, and a drive chain 29 engaging a sprocket carried by each end of the shaft 30 of the power wheel 27. Suitable clutch mechanism 31 is provided, whereby to disconnect and connect the shaft 30 with the shaft 4.

The units E may be utilized as power generating units, when the apparatus is held fixed in the current. Under these circumstances, the shaft 30 of the unit may be provided with a wheel 32 which is geared to a generator 33 discharging to batteries 34, as shown in Fig. 2.

Instead of utilizing the direct gear heretofore described, the units E, when propelling the apparatus, may be driven by means of storage batteries 35, connected to a motor 36, provided with a shaft carrying a gear 37 operatively engaging a gear 38 carried by the shaft 30.

In Fig. 1 is shown means for adjustably varying the slack of the chain, said means comprising a frame 39 which is positioned between the upper and lower sections of the cable 1, said frame carrying pulleys 40 adapted to receive the cable along its top and bottom. Turnbuckles 41 are provided in the vertical bars of the frame 39, whereby to raise or lower the cable 1, as shown in Fig. 1. In operation, the cable, and the yoke 17, is received by the pulleys 40, as shown in Fig. 5, and suitably spaced depressions are also formed in the wheels 2, adapted to engage the yokes 17, as shown in Fig. 10.

The rear wheel 2 is mounted in a support 42, provided with a laterally elongated slot 43, adapted to receive the axle of said wheel, as shown in Fig. 1. By moving the rear wheel 2 nearer the front wheel, the immersion depth of the propellers may be adjusted as desired, suitable blocks 44, being placed in the slot 43 to hold the wheel in its adjusted position.

From the foregoing, it should be obvious that I have devised an apparatus capable of maximum efficiency in harnessing the power of running water. In the practical operation of my apparatus, it may be arranged in water running in the direction of the arrow, and the paddles (here indicated by the letters a, b, c, d and e, Fig. 1), are successively presented to the water in the order indicated, the paddles a and b being here shown in position for efficient service. As the paddle c enters the water, if it were a solid paddle, the water would tend to pile up in front or on the upstream side, resulting in the formation, at the rear of the paddle c, of what might be termed a "hole" in the water. Under these circumstances, the power of the current would not be appreciably transmitted to the paddles b or a, and these paddles would retard rather than assist in the rotation of the power shaft 4, of the wheel 2. In foraminated paddles however, that portion of the water which would tend to pile up in front of a solid paddle now passes through the paddle c and its power is transmitted directly to the paddle b, and thence through b to a, etc., resulting in a loss of power for each paddle, but insuring that every paddle is a factor in the rotation of the shaft 4. By allowing a certain volume of water to pass through every paddle, as above set forth, the power of the apparatus is greatly increased, as will be understood.

The dam units 24, and the accelerator units E, may or may not be utilized, dependent upon the conditions to be met. Under some circumstances I may use the duplex paddle structure shown in Figs. 16 and 17.

It is to be noted that the paddle structure shown in Figs. 5, 6 and 7 provides for the relatively large openings 7 transversely through the paddles. All of these openings are in alignment when the paddles are in the water, as clearly indicated in Fig. 9, and consequently a portion of the current passes through this line of openings with comparative freedom while other portions of the water pass through the apertures and slots with less freedom. Due to the openings 7 however a virtual belt of water is constantly passing through the paddles, tending to feed the successive paddles and to buoy and support the whole line.

It is to be noted that, in the constructions here illustrated, every paddle is provided with a plurality of transversely extending water passages. In Figs. 5, 6 and 7, such passages are illustrated as a large slot 7, extending upwardly, from the bottom edge of both sides of the paddle, to a point above the central longitudinal line of the latter, a plurality of smaller and rounded apertures 5' also passing through both sides of the paddle. The apertures 5' may be bored through the sides and top of the paddle at regular intervals or promiscuously, the intent being to present as many water passages as possible without too greatly weakening the paddle structure. For obvious reasons however, the apertures 5' are not provided in those portions of the paddle which encloses the sealed chambers 8. The numerous apertures 5' are necessary to the successful operation of my paddle structures. If the slots 7 were relied upon solely for the passage of water, the latter would pile up around the solid portions of the paddle adjacent the slot 7, and not be properly fed to the paddle in front. With the many apertures 5', the water rushes through them under increased velocity, and uniformly contacts or feeds the next paddle, it being one of the important features of this invention to permit water contact against the solid portions of the face of every immersed paddle, throughout its entire area, in so far as possible, while necessarily permitting water to pass through each paddle for feeding the next paddle.

It is to be observed that the paddle structure shown in Figs. 15 to 18 inclusive, carry out the general idea as just above set forth. Each of the plates 21 is of foraminated construction, thereby presenting, throughout its entire area, a surface which carries solid portions for water contact, and apertured portions permitting the passage of the water to the next paddle.

Various modifications of the structures herein depicted may be suggested to those skilled in the art, but I claim as my invention all such modifications as fall fairly within the scope of the appended claims.

What I claim is:

1. A paddle for current motors, comprising a member adapted for contact by the current and provided with a plurality of elongated water-passages extending inwardly from one of its marginal edges, and a plurality of apertures extending through said member, on each side of said passages.

2. A paddle for current motors comprising a member provided with an elongated water-passage extending inwardly from one of its marginal edges and terminating short of the opposite edge, and a buoyant element connected to said member, adjacent the said opposite edge.

3. A paddle for current motors comprising a hollow member having a closed top, in operative position, and two pendant sides, buoyant elements carried in the top of said member, and aligned slots in the sides of said member, substantially as described.

4. A paddle for current motors comprising a hollow member having a closed top, in operative position, and two pendant sides, buoyant elements carried in the top of said member, aligned slots in the sides of said member, and a plurality of apertures extending through said member adjacent said slots.

5. In a current motor, a chain made up of a supporting cable carrying a plurality of paddle members adapted for contact by the current, each of said members being adapted to straddle said cable and having pendant sides provided with elongated water-passages formed therein, the passages in the sides being in alignment.

6. In a current motor, a chain made up of a supporting cable carrying a plurality of paddle members adapted for contact by the current, each of said members being adapted to straddle said cable and having pendant sides provided with elongated water-passages formed therein, the passages in the sides being in alignment, and a plurality of apertures on each side of said elongated passages.

7. A current motor including a chain of water impact members pivotally mounted on a cable, each member straddling said cable and being provided with elongated water-passages through the pendant sides, below the plane of the cable.

8. A current motor including a chain of water impact members pivotally mounted on a cable, each member straddling said cable and being provided with elongated water-passages through the pendant sides, below the plane of the cable and with a plurality of apertures on each side of said passages.

In testimony whereof I affix my signature.

CARL J. BAER.